Patented Feb. 6, 1945

2,368,640

UNITED STATES PATENT OFFICE 2,368,640

PRODUCTION OF HYDROGEN PEROXIDE

Gerhard A. Cook, Snyder, N. Y., assignor to Carbide and Carbon Chemicals Corporation, a corporation of New York No Drawing. Application October 18, 1941, Serial No. 415,647

8 Claims. (Cl. 23—207)

The invention relates to the production of hydrogen peroxide, and particularly to producing this compound by thermal synthesis directly from the elements hydrogen and oxygen.

Many ways have been proposed in the art for making hydrogen peroxide, the more common of which employ the reaction of an acid on a peroxide like sodium peroxide or barium peroxide, or the electrolytic method in which the product is formed at the anode of an electrolytic cell. Preparation has also been made by the electrolytic reduction of oxygen at the cathode, and by the autooxidation of certain readily oxidizable organic compounds which easily release their hydrogen atoms. Processes are known in which hydrogen and oxygen are directly combined under the influencing factors of a silent electric discharge, an intensely heated wire, or an ultra-violet light source, and combination of the elements by direct thermal synthesis without the aid of other reaction-promoting energy, has also been tried. To my knowledge, however, no one has, heretofore, made hydrogen peroxide by a direct thermal synthesis of hydrogen and oxygen gas with satisfactory results, or with yields at all suitable to commercial requirements.

It is an object of this invention to produce hydrogen peroxide by a strictly thermal synthesis from the elements hydrogen and oxygen, and to provide a reproducible and continuous process of this character, capable of yields satisfactory for commercial production.

The invention is based upon the finding of the particular, and most suitable, operating conditions for such a reaction, and upon the discovery of certain surfaces which in contact with the reaction gases promote and enhance the yields of hydrogen peroxide. In general the process consists in passing a gaseous mixture containing hydrogen and oxygen, with the hydrogen preferably well in excess, through a heated tube, or other vessel, having a gas-contacting surface of a nature to be later described, and collecting the peroxide formed in a suitable absorber or in cooling and condensing equipment. The reaction may be conducted under atmospheric pressure, although pressures greater than atmospheric are more beneficial. The gas mixture temperature, which will vary somewhat with other conditions, especially with the pressure, but also to some extent with the vessel surface, the gas composition, and the space velocity of the gaseous mixture, is held a few degrees below the point where rapid combustion or explosion may take place in the reaction vessel. This is to avoid the rapid water-forming reaction which occurs at temperatures sufficient to cause combustion, and the better yields have been obtained at temperatures between about 400° C. and 650° C. The reaction is strictly a thermal one, as compared with those utilizing an electric discharge, radiant energy, or other extraneous sources of energy for promoting the peroxide formation.

A number of different kinds of material have been found to provide surfaces favorable to improved yields of the peroxide. The physical properties of these materials, as well as their chemical nature, are important, and with other factors equal, the smoother the surface, the better are the results obtained. Porosity, and sharp irregularities in the surface are detrimental. Thus smooth ceramic materials, like glazed porcelain, vitreous "porcelain" enamel, fused silica, and types of silica-containing glass sufficiently refractory to withstand the reaction temperatures, are suitable, and can be used to make, line or coat the reaction vessel in which the synthesis takes place. These surfaces can be further improved by treatment with boric acid before use, and preferably by fusing the boric acid on to the surface at a temperature of 650° C. or higher, provided the surface is sufficiently refractory to permit such fusing. The boric acid treated surface not only improves the peroxide yields, but makes them more reproducible and permanent.

In place of the boric acid, or in mixture therewith, borates of aluminum, ammonium, copper, lithium, nickel, sodium, manganese, silver, and zinc, applied to refractory glass, may also produce surfaces of suitable activity; and other favorable coatings have been made from mixtures of boric acid with oxides of beryllium, cerium, columbium, germanium, phosphorus, samarium, thorium, tin, titanium, and zinc; or mixtures of boric acid with ammonium silicotungstate, boron nitride, amorphous boron, and borotungstic acid. In all of these modified surface coating materials, however, it is believed that the favorable effects of the resulting surface are due largely to the presence of the fused boric acid or boric oxide. Metal oxides and borates which might be reduced to the metal in the presence of excess hydrogen definitely should be avoided as the surface material, since contact of the reaction gases with a bare metal, or with certain known oxidation catalysts like vanadium pentoxide, is harmful, and tends to promote a water-forming rather than a peroxide-forming reaction. Carbon and graphite have also proved detrimental for similar reasons.

Certain diluent gases or vapors, incorporated in the essential gas reaction mixture, also aid in the reaction, and appear to exert a favorable effect, either through an action themselves in the gas phase or by further modifying the contact surface, or both. Water vapor, for example, in amounts from 1% to 40%, has substantially improved the peroxide yields, when used in conjunction with smooth refractory surfaces.

A tubular reaction vessel is convenient although the particular form of the reactor is not believed essential to the results accomplished. Vessels of refractory glass can be used, reinforced, if necessary, to withstand pressure, or metal vessels coated with porcelain enamel may be suitable. Treatment of the interior surface of the reactor with boric acid, or with the mixtures specified, may be accomplished in any suitable manner, as will be represented in subsequent examples, and a packing of rings or saddles surfaced in similar manner may be used with careful and proper distribution of the packing pieces, and with the avoidance of too great a surface area. Reaction tube sizes varying from 0.15 to 1.25 inches inside diameter, and from 4 inches to 18 feet in length, have been used successfully.

Hydrogen peroxide can be formed by this process from mixtures of hydrogen and oxygen in almost any ratio, provided there is at least a substantial proportion of each of the gases present. However, an excess of hydrogen over the stoichiometric quantity required to react with oxygen to form hydrogen peroxide is favorable to the reaction, with the optimum proportion of hydrogen to oxygen varying with the pressure and temperature. Usually the best percentage of oxygen in the reaction mixture will decrease as the pressure increases, varying, for example, from as much as 20% or more oxygen at atmospheric pressure, to as little as 2% oxygen and 98% hydrogen at a gage pressure of 175 pounds per square inch. The exact optimum oxygen content at any pressure again varies somewhat with temperature, but there is advantage in selecting and correlating all operating conditions so that good yields are obtained with an oxygen content in the gas mixture of less than 10%, and preferably less than 6%. This decreases the hazard of explosion, it provides less oxygen for burning to water, should the water-forming reaction be initiated, and it improves the thermal conductivity of the gas mixture, permitting more rapid removal of the heat of the reaction, and more efficient heat recovery in heat exchangers from the hot gases leaving the reaction vessel.

In reasonable proportions most diluent gases are not detrimental to the hydrogen peroxide formation. Nitrogen, for example, may be present in amounts up to 25% without seriously affecting the yield. Hydrocarbon gases and chlorine in small amounts do not seriously interfere with the essential reaction, but they set up side reactions which are undesirable. Nitrogen dioxide and other oxides of nitrogen, or carbon monoxide, are, however, definitely harmful, and should be avoided in the reaction gas mixture.

As above indicated the preferred reaction temperatures also vary with other conditions, but for any given reaction vessel, gas mixture composition, space velocity and pressure, there is a definite optimum temperature, which is below but within a few degrees of the temperature at which a rapid water-forming reaction sets in. The latter reaction may be associated with, or take the form of, an explosion, which is mild for low concentration of oxygen in the gas mixture, but becomes more powerful as the percentage of oxygen is increased to 6% or higher and as the diameter of the reaction vessel is increased. During the burning or explosion no more than traces of hydrogen peroxide are formed. In any case a temperature either too high or too low is detrimental, and a determination by trial for any given set of other conditions is usually necessary to establish the most suitable operating temperature. Having determined this factor, it is then advantageous that a careful and close temperature control be maintained.

The pressures employed in the reaction may vary from atmospheric to as high as can be conveniently handled, but within a range from about 5 to 35 atmospheres absolute definite improvement in the peroxide yields has been obtained. Preferred space velocities (volume of gas processed per volume of reaction space per unit time) will vary with the pressure, and with the type of reaction vessel used, but in general, the greater the pressure and the smaller the diameter of the reaction vessel, the higher will be the space velocity that may be employed.

The following examples are representative of many tests of the process which have been made, and will further illustrate the invention.

*Example 1*

A clear fused silica tube approximately 6 mm. inside diameter was treated internally with a hot saturated solution of boric acid, dried and heated for 15 minutes to a temperature of about 700° C. A fused boric acid coating was thus produced, which probably attacked the silica surface to a certain extent, forming some borosilicate. After cooling, this tube was installed inside a stainless steel pipe heated by a stirred molten salt bath, the temperature of which was automatically controlled. A 32-inch length of the pipe and tube was maintained at the salt bath temperature. A mixture of hydrogen and air so adjusted as to provide 4.5% of oxygen was passed through the tube at the rate of 10 cubic feet per hour (measured, in this and the succeeding examples, at 1 atmosphere pressure and 25° C.). At a bath temperature of 521° C. to 522° C., and a gage pressure of 175 pounds per square inch, hydrogen peroxide was formed at the rate of 520 milligrams per hour. This corresponds to a space-time yield of 22.6 grams hydrogen peroxide per liter of reaction space per hour. 2.93% of the total input oxygen, and 10% of the oxygen used up in the reaction, was converted to hydrogen peroxide.

*Example 2*

A stainless steel tube with vitreous porcelain enamel on the inside surface, giving an inside diameter of about 24 mm., was washed with a solution of boric acid. The boric acid was dried with an air stream. The tube was then mounted in a stirred molten salt bath so as to heat a 56-inch length of the tube. A mixture of hydrogen and air adjusted to provide 3.5% oxygen was passed through the tube at the rate of 125 cubic feet per hour. At a bath temperature of 531° C., and a gage pressure of 135 pounds per square inch, hydrogen peroxide was formed at the rate of 3.18 grams per hour. This corresponds to a yield of 5.06 grams hydrogen peroxide per liter of reaction space per hour. 1.85% of the total input oxygen, and about 19% of the oxygen used up in the reaction, was converted to hydrogen peroxide.

Example 3

A tube made of clear refractory glass containing approximately 20% alumina, with an inside diameter of about 18 mm., was treated with boric acid. The boric acid was fused on to the interior surface by heating at a temperature of about 700° C. for 15 minutes. The first third of this tube was packed with ¼ inch porcelain saddles, which had previously been soaked in a solution of boric acid, and heated to 700° C. for 15 minutes. The packed glass tube was then installed inside an enameled steel tube, and heated by means of a molten salt bath over a 56-inch length of the tube. A mixture of 98% hydrogen and 2% oxygen was passed through the tube at the rate of 100 cubic feet per minute, and at a bath temperature of 517° C. to 522° C., and a gage pressure of 175 pounds per square inch, hydrogen peroxide was formed at the rate of 3.22 grams per hour. This corresponds to a space-time yield of 8.7 grams hydrogen peroxide per liter of reaction space per hour. 4.1% of the total input oxygen, and about 20% of the oxygen used up in the reaction, was converted to hydrogen peroxide.

Example 4

A refractory glass tube similar to the one of Example 3, with a clean surface, and free from packing or boric acid, was mounted in a salt bath as before. A gas mixture was fed to the tube at the rate of 60 cubic feet per hour, at a gage pressure of 95 pounds per square inch, and with the temperature of the molten bath maintained at 541° C. to 546° C. When a dry gas mixture consisting of 2% oxygen, 7.5% nitrogen and 90.5% hydrogen was used, hydrogen peroxide was formed at the rate of 0.515 gram per hour, but when water vapor was introduced so that the gas composition was approximately 2% oxygen, 7.5% nitrogen, 69% hydrogen, and 21.5% water vapor, the hydrogen peroxide production rate rose to about 2½ times this value, or 1.33 grams per hour.

Example 5

A "satin surface" vitreous silica tube 16 mm. inside diameter was cleaned with hydrochloric and nitric acid, washed with distilled water, and dried. The cleaned tube was enclosed in a steel pipe, and heated for a length of 56 inches by means of a stirred molten salt bath at a temperature of 527° C. to 531° C. A gas mixture consisting of 95.5% hydrogen and 4.5% oxygen was fed to the tube at a gage pressure of 135 pounds per square inch, and at the rate of 60 cubic feet per hour. Hydrogen peroxide was formed at the rate of 1.66 grams per hour.

Example 6

A tube made of clear refractory glass containing approximately 20% alumina, having an inside diameter of 13 mm., was treated with boric acid as in Example 1. The tube was heated in an electric furnace over a length of 32 inches, and by means of a control including a thermocouple the temperature was maintained at 595° C. A gas mixture consisting of 80% hydrogen and 20% oxygen was passed through the tube at atmospheric pressure, and at a rate of 7 cubic feet per hour. Hydrogen peroxide was formed at the rate of 179 milligrams per hour, which is the equivalent in yield of 1.66 grams hydrogen peroxide per liter of reaction space per hour.

Example 7

A steel tube 25.2 mm. inside diameter, coated on the inside with vitreous porcelain enamel, was heated for a length of 56 inches by a stirred molten salt bath at a temperature of 558° C. to 560° C. No treatment, except washing, was given the porcelain enamel surface. Using a mixture of hydrogen and air adjusted to give 2% oxygen, a gage pressure of 250 pounds per square inch, and a flow of 250 cubic feet per hour, hydrogen peroxide was made at the rate of 1.51 grams per liter of reaction space per hour.

Example 8

Using the same enamel tube as in Example 7 the half of this tube nearest the exit end was lined with a clear refractory glass containing approximately 20% alumina. No surface treatment was given to the glass. Using again a reaction gas mixture containing 2% oxygen, a gage pressure of 250 pounds per square inch, a gas flow of 150 cubic feet per hour, and a salt bath temperature of 538° C. to 544° C., the yield of hydrogen peroxide was 3.44 grams per liter of reaction space per hour.

Example 9

A dry mixture of hydrogen and air, so adjusted as to contain 4.5% of oxygen, was passed at atmospheric pressure through a clear refractory glass tube (high in silica and alumina). The tube, about 13 mm. inside diameter, was heated to a temperature of 600° C. over a length of approximately 30 inches. With the mixture passing through the tube at the rate of 6 cubic feet per hour, 0.4% of the oxygen was converted to hydrogen peroxide, but when water vapor was added by bubbling the gases, prior to processing, through water heated at 60° C., the oxygen conversion was exactly doubled. Most of the effluent oxygen and hydrogen were unreacted, and could, therefore, be recycled.

The above examples are merely illustrative, and numerous modifications in actual operating conditions are contemplated within the broader scope of the invention.

The mechanism of this thermal synthesis of hydrogen peroxide has not been firmly established. It is believed, however, that a chain reaction is involved, which is initiated by the formation of hydrogen atoms in the gas phase, or perhaps partly on the walls of the reaction vessel, and which continues mostly in the gas phase in accordance with the equations:

(a) $H + O_2 + M \rightarrow HO_2 + M + 52$ kilocalories
(or more)
(b) $HO_2 + H_2 \rightarrow H_2O_2 + H - 18$ kilocalories "M" is any third molecule in the gas phase, or the surface of the reaction vessel.

The first of these sub-reactions is exothermic, and greatly favored by increase of pressure, but if the two reactions are allowed to go too fast, so that more heat is developed than can be quickly carried off, the rapid formation of water takes place, by processes such as:

(c) $\quad H + O_2 \rightarrow OH + O$
(d) $\quad O + H_2 \rightarrow OH + H$
(e) $\quad OH + H_2 \rightarrow H_2O + H$ Surfaces favorable to hydrogen peroxide formation, such as those treated with boric acid or boric oxide, are believed to partially reflect the $HO_2$ and $H_2O_2$ molecules which come in contact with them, instead of completely adsorbing or destroying these molecules. Such surfaces also aid in carrying off part of the heat of the reaction, so as to permit close control of the temperature and prevent the onset of rapid combustion. Surfaces unfavorable to thermal hydrogen peroxide synthesis may either efficiently adsorb the $HO_2$ molecules which come in contact with them, so that the above sub-reaction (b) takes place to only a very slight extent, or they may too readily decompose any hydrogen peroxide which comes into contact with them. Surfaces of bare metals and of certain oxides, such as vanadium oxides, are believed to be harmful in both the ways mentioned, and also because they catalyze rapid water-forming surface reactions, or initiate rapid combustion in the gas phase.

The favorable effect of water vapor is believed to be due mostly to its efficient action as a third molecule "M" in the sub-reaction (a) above, and in part also to "activated" adsorption on the surface of the reaction vessel, where it has an effect similar to that of boric oxide.

The exact mechanism of this reaction, and the true function of the surfaces specified, may, however, ultimately be found to differ from the explanation here given, and it will be understood that no limitation is imposed on the invention by the theory expressed.

As previously indicated the treatment of the interior reaction vessel surface with boric acid, boric oxide, or the borates mentioned, may be effected in any suitable manner. Application of boric acid can be made with an aqueous solution of the acid, or a suspension thereof in an organic solvent such as acetone, and also by hydrolysis of ethyl borate with steam or pyrolysis in situ of methyl borate. Either a dried or high-temperature fused coating has produced good results. When boric acid is applied to a ceramic base, and then heated to 650° C. or above, the resulting surface film is probably in part a borosilicate, or with an alumina-containing glass, partly a boroaluminate. However formed, the additive surface film assumes a certain state of hydration corresponding to an equilibrium automatically set up under the conditions of use for peroxide production, and it will be understood that where these coatings or films are referred to a degree of hydration is assumed in accordance with the conditions to which they are subjected. The actual extent of hydration will be largely determined by the temperature, and by the partial pressure of the water vapor present in the gas adjacent to the surface, said water vapor occurring either by reaction between the hydrogen and oxygen, or through introduction with the initial reaction gas mixture.

The particular manner of recovering or utilizing the hydrogen peroxide from the reaction gas stream is of no concern to the present invention. The product may be recovered by condensation through cooling, or by scrubbing with a suitable liquid, such as a solution of hydrogen peroxide in water. Direct utilization of the hydrogen peroxide vapor while still in the gas stream may also be effected, by introducing into the stream the vapors of an organic compound with which the peroxide will react.

In the claims, where a "smooth ceramic material" is referred to, it is intended to include glazed porcelain, vitreous "porcelain" enamel, vitreous silica ("fused quartz"), earthenware or stoneware having a relatively dense, non-porous structure, or a glazed surface, and similar smooth refractory materials. "Hydrogen in excess" means a proportion of hydrogen by volume greater than the volume of oxygen present, since, stoichiometrically, one volume of hydrogen reacts with one volume of oxygen to give one volume of hydrogen peroxide vapor. The temperature of "rapid combustion," as described heretofore, refers to the condition under which the content of oxygen in the effluent gas (hydrogen being used in excess) is zero, or nearly zero, and only very small quantities, if any, of hydrogen peroxide are formed. The main reaction product under these conditions is water.

Many modifications in actual operating conditions, and procedure, will be evident to those skilled in the art, and are intended to be included within the broader scope of the invention.

In my copending applications Serial Nos. 461,125 and 466,829, I have disclosed other aspects of the subject matter contained herein.

I claim:

1. Process for preparing hydrogen peroxide which comprises passing a gaseous mixture containing hydrogen and oxygen through a reaction vessel, said vessel having a gas contacting interior surface coated in a continuous layer with a member of the group consisting of boric acid and boric oxide, while maintaining said gaseous mixture at a temperature from about 400° C. to 650° C. and below the temperature of rapid combustion.

2. Process for preparing hydrogen peroxide which comprises passing a gaseous mixture containing hydrogen and oxygen through a reaction vessel, said vessel having a gas contacting interior surface coated in a continuous layer with a member of the group consisting of boric acid and boric oxide, while maintaining said gaseous mixture under a pressure greater than atmospheric, and at a temperature from about 400° C. to 650° C. and below the temperature of rapid combustion.

3. Process for preparing hydrogen peroxide which comprises passing a gaseous mixture containing hydrogen, oxygen and water vapor through a reaction vessel, said vessel having a gas contacting interior surface coated in a continuous layer with a member of the group consisting of boric acid and boric oxide, while maintaining said gaseous mixture under a pressure greater than atmospheric, and at a temperature from about 400° C. to 650° C. and below the temperature of rapid combustion.

4. Process for preparing hydrogen peroxide which comprises passing a gaseous mixture containing hydrogen in excess and oxygen in an amount less than 10% through a reaction vessel, said vessel having a gas contacting interior surface coated in a continuous layer with a member of the group consisting of boric acid and boric oxide, while maintaining said gaseous mixture under a pressure greater than atmospheric, and at a closely controlled temperature near to but below the point of rapid combustion and between about 400° C. to 650° C.

5. Process for preparing hydrogen peroxide which comprises passing a gaseous mixture containing hydrogen in excess, oxygen in an amount less than 10%, and water vapor in an amount from 1% to 40%, through a reaction vessel, said vessel having a gas contacting interior surface coated in a continuous layer with a member of the group consisting of boric acid and boric oxide, while maintaining said gaseous mixture under a pressure greater than atmospheric, and at a closely controlled temperature below the point of rapid combustion and between about 400° C. to 650° C.

6. Process for preparing hydrogen peroxide which comprises passing a gaseous mixture containing hydrogen in excess, oxygen in an amount less than 10%, and water vapor in an amount from about 1% to 40%, through a reaction vessel, said vessel having a gas contacting interior surface coated with a continuous layer of fused boric acid, while maintaining said gaseous mixture under a pressure of from about 5 to 35 atmospheres, and at a closely controlled temperature below the point of rapid combustion and between about 400° C. to 650° C.

7. In the process of preparing hydrogen peroxide by direct thermal synthesis of hydrogen and oxygen at temperatures exceeding about 400° C., the step which comprises passing a gaseous mixture containing hydrogen and oxygen through a reaction vessel, the gas contacting surface of said vessel having a fused coating forming a continuous layer therewith composed of a member of the group consisting of boric acid and boric oxide.

8. In the process of preparing hydrogen peroxide by direct thermal synthesis of hydrogen and oxygen at temperatures exceeding about 400° C., the step which comprises passing a gaseous mixture containing hydrogen and oxygen through a reaction vessel, in the presence of water vapor, the gas contacting surface of said vessel having a fused coating forming a continuous layer therewith composed of a member of the group consisting of boric acid and boric oxide.

GERHARD A. COOK.